(12) United States Patent
Cho et al.

(10) Patent No.: US 12,398,250 B2
(45) Date of Patent: Aug. 26, 2025

(54) OXYGEN BARRIER FILM, FOOD PACKAGING MATERIAL COMPRISING SAME, AND METHOD FOR PRODUCING OXYGEN BARRIER FILM

(71) Applicant: EVERCHEMTECH Co., Ltd., Gyeonggi-do (KR)

(72) Inventors: So Hyeon Cho, Seoul (KR); Na Young Pak, Gyeonggi-do (KR); Young Ju Choi, Gyeonggi-do (KR); Chan Suk Yoon, Jeollabuk-do (KR)

(73) Assignee: EVERCHEMTECH Co., Ltd., Gyeonggi-do (KR)

( * ) Notice: Subject to any disclaimer, the term of this patent is extended or adjusted under 35 U.S.C. 154(b) by 428 days.

(21) Appl. No.: 17/433,605

(22) PCT Filed: Nov. 16, 2020

(86) PCT No.: PCT/KR2020/016083
§ 371 (c)(1),
(2) Date: Aug. 25, 2021

(87) PCT Pub. No.: WO2021/107477
PCT Pub. Date: Jun. 3, 2021

(65) Prior Publication Data
US 2022/0153938 A1      May 19, 2022

(30) Foreign Application Priority Data
Nov. 25, 2019   (KR) .................. 10-2019-0152597

(51) Int. Cl.
| | |
|---|---|
| C08J 5/18 | (2006.01) |
| B32B 7/12 | (2006.01) |
| B32B 27/08 | (2006.01) |
| B32B 27/32 | (2006.01) |
| B32B 27/36 | (2006.01) |
| B65D 65/02 | (2006.01) |
| C09J 7/38 | (2018.01) |
| C09J 7/40 | (2018.01) |
| C09J 11/06 | (2006.01) |

(52) U.S. Cl.
CPC ............... *C08J 5/18* (2013.01); *B32B 7/12* (2013.01); *B32B 27/08* (2013.01); *B32B 27/32* (2013.01); *B32B 27/36* (2013.01); *B65D 65/02* (2013.01); *C09J 7/38* (2018.01); *C09J 7/401* (2018.01); *C09J 11/06* (2013.01); *B32B 2255/10* (2013.01); *B32B 2255/26* (2013.01); *B32B 2307/7244* (2013.01); *B32B 2307/732* (2013.01); *B32B 2439/70* (2013.01); *C09J 2301/162* (2020.08); *C09J 2405/006* (2013.01); *C09J 2423/045* (2013.01); *C09J 2467/006* (2013.01); *C09J 2475/00* (2013.01); *C09J 2489/006* (2013.01)

(58) Field of Classification Search
CPC ... C08J 5/18; B32B 7/12; B32B 27/08; B32B 27/32; B32B 27/36; B32B 2255/10; B32B 2255/26; B32B 2307/7244; B32B 2307/732; B32B 2439/70; C09J 7/38; C09J 7/401; C09J 11/06; C09J 2301/162; C09J 2405/006; C09J 2423/045; C09J 2467/006; C09J 2475/00; C09J 2489/006
See application file for complete search history.

(56) References Cited

U.S. PATENT DOCUMENTS

| | | | |
|---|---|---|---|
| 2003/0077462 A1 | 4/2003 | Utz et al. | |
| 2012/0153520 A1 | 6/2012 | Liu et al. | |
| 2013/0017400 A1* | 1/2013 | Imai ................. | C08J 7/0427 977/762 |
| 2021/0079252 A1* | 3/2021 | Hara ................ | C08F 220/56 |

FOREIGN PATENT DOCUMENTS

| | | |
|---|---|---|
| EP | 2551104 A1 | 1/2013 |
| JP | 2012131970 | 7/2012 |
| JP | 2016011392 | 1/2016 |
| JP | 2016011392 A | 1/2016 |
| KR | 20030062388 | 7/2003 |
| KR | 20030062388 A * | 7/2003 |
| KR | 20150107397 | 9/2015 |
| KR | 101820878 | 1/2018 |
| KR | 20190028632 | 3/2019 |
| KR | 20190094848 | 8/2019 |
| WO | 2016204698 A1 | 12/2016 |

OTHER PUBLICATIONS

Machine Translation of Hong et al. KR 20030062388 A (Year: 2003).*
"International Search Report (Form PCT/ISA/210) of PCT/KR2020/016083," mailed on Feb. 22, 2021, pp. 1-4.
"Office Action of Korea Counterpart Application", issued on Feb. 26, 2021, with English translation thereof, p. 1-p. 14.
Database WPI, XP 2810421, dated Feb. 21, 2016.
Xia Changlei et al., "Property enhancement of soy protein isolate based films by introducing POSS", International Journal of Biological Macromolecules, dated Nov. 14, 2015.
Tian Huafeng et al., "Fabrication, properties and applications of soy-protein-based materials: A review", International Journal of Biological Macromolecules, dated Aug. 23, 2018.
Extended EU Search Report, dated Nov. 17, 2023.

* cited by examiner

*Primary Examiner* — Callie E Shosho
*Assistant Examiner* — Bethany M Miller
(74) *Attorney, Agent, or Firm* — ZION IP; Byungwoong Park

(57) ABSTRACT

Disclosed are an oxygen barrier film, a food wrapper including the same, and a method of preparing the oxygen barrier film. The oxygen barrier film may include: a base layer; and an organic/inorganic hybrid layer located on the base layer and including a natural hydrogel and a silane coupling agent.

11 Claims, 4 Drawing Sheets

OXYGEN BARRIER FILM, FOOD PACKAGING MATERIAL COMPRISING SAME, AND METHOD FOR PRODUCING OXYGEN BARRIER FILM

CROSS-REFERENCE TO RELATED APPLICATION

This application is a 371 application of the International PCT application serial no. PCT/KR2020/016083, filed on Nov. 16, 2020, which claims the priority benefit of Korea Patent Application no. 10-2019-0152597, filed on Nov. 25, 2019. The entirety of each of the above mentioned patent applications is hereby incorporated by reference herein and made a part of this specification.

TECHNICAL FIELD

The present disclosure relates to an oxygen barrier film, a food wrapper including the same, and a method of preparing the oxygen barrier film.

BACKGROUND ART

In modern life, various food wrappers are widely used for packaging retort food, lunch boxes, ramen, instant rice, and the like. In such food wrappers, for example, it is important to maintain the freshness of food for a long time by providing appropriate barrier properties (blocking properties) to moisture or oxygen.

Recently, interest in the environment and health have increased. In accordance with this trend, many studies on food wrappers using natural materials as eco-friendly materials are being conducted.

However, food wrappers using natural materials have a problem in that a natural material layer is placed on a base film without being fixed, so that interlayer adhesive force between the base film and the natural material layer is weak, and thus mechanical properties are deteriorated.

Therefore, there is still demand for an oxygen barrier film having excellent interlayer adhesive force between the base film and the natural material layer and excellent oxygen barrier properties, a food wrapper including the same, and a method of preparing the oxygen barrier film.

DESCRIPTION OF EMBODIMENTS

Technical Problem

An aspect is to provide an oxygen barrier film having excellent adhesive force between a base layer and an organic-inorganic hybrid layer while having excellent oxygen barrier properties.

Another aspect is to provide a food wrapper including the oxygen barrier film.

Another aspect is to provide a method of preparing the oxygen barrier film.

Solution to Problem

According to an aspect, there is provided an oxygen barrier film including:
a base layer; and
an organic/inorganic hybrid layer located on the base layer and including a natural hydrogel and a silane coupling agent.

The organic/inorganic hybrid layer may have a structure in which the silane coupling agent is dispersed and cross-linked in the natural hydrogel having a three-dimensional network structure.

The natural hydrogel may include protein, carbohydrate, or a combination thereof.

The protein may include whey protein isolate (WPI), whey protein concentrate (WPC), soy protein isolate (SPI), rice protein isolate (RPI), oat Protein (oat protein isolate: OPI), pea protein isolate (PPI), casein, sodium caseinate, corn zein, gelatin, wheat protein (gluten), or a combination thereof.

The carbohydrate may include pullulan, carrageenan, chitosan, starch, agar, pectin, or a combination thereof.

The silane coupling agent may include a silane containing a functional group selected from a vinyl group, an amino group, an epoxy group, an acryl group, a methacrylic group, a methoxy group, an ethoxy group, a trimethoxy group, a triethoxy group, or a combination thereof.

A weight ratio of solids of the protein hydrogel to the silane coupling agent may be 10:1 to 1:10.

The base layer includes a polyolefin-based substrate, a polyester-based substrate, or a combination thereof.

According to another aspect, there is provided a food wrapper including:
the above-described oxygen barrier film;
an adhesive layer located on the oxygen barrier film; and
a polymer layer located on the adhesive layer.

The adhesive layer may include an oil-based adhesive, an aqueous adhesive, or a combination thereof.

The polymer layer may include a polyethylene-based polymer, polypropylene-based polymer, polyamide-based polymer, or a combination thereof.

According to another aspect, there is provided a method of preparing an oxygen barrier film, the method including:
adding a silane coupling agent and a filler to an aqueous protein solution to prepare a pre-composition for an organic-inorganic hybrid layer;
heat-treating and then cooling the pre-composition for an organic-inorganic hybrid layer to prepare a composition for an organic-inorganic hybrid layer; and
applying the composition for an organic-inorganic hybrid layer onto a base layer to prepare the above-described oxygen barrier film.

The heat treatment may be performed at a temperature of 70° C. to 120° C. for 1 hour to 5 hours.

Advantageous Effects of Disclosure

Since the oxygen barrier film according to one aspect includes an organic-inorganic hybrid layer including a protein hydrogel and a silane coupling agent on the base layer, it has excellent oxygen barrier properties and has excellent adhesive force between the base layer and the organic-inorganic hybrid layer. The food wrapper including the oxygen barrier film is environmentally friendly and renewable. The method of manufacturing the oxygen barrier film can easily manufacture the oxygen barrier film.

MODE OF DISCLOSURE

Figure 1:
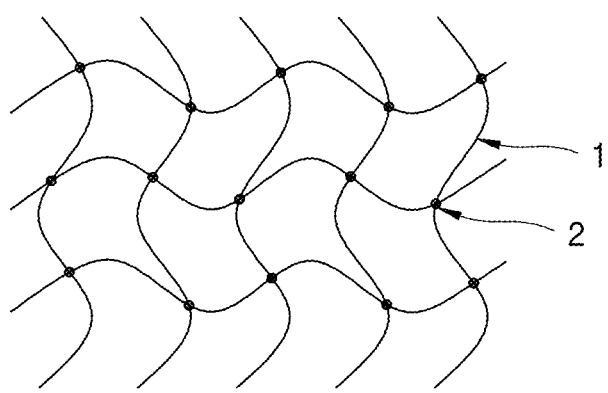
FIG. 1 is a schematic view of an oxygen barrier film according to an embodiment.

Hereinafter, specific details and possible embodiments for carrying out the present disclosure will be described. However, with respect to the configuration not specifically defined below, unless contrary to the purpose of the present disclosure, contents known in the relevant technical field may be applied.

As used herein, the "layer" refers to a broad concept including "a film, a stretched sheet, an unstretched sheet, or the like".

As used herein, when any layer or member is said to be located "on" another layer or member, this includes a case in which one layer or member is adjacent to another layer or member as well as a case in which another layer or another member exists between two layers or two members.

As used herein, the term "~based" polymer or compound is used to refer to a concept including a "~" polymer or compound and a "derivative thereof".

As used herein, when a part "includes" a certain component, this means that other components may be added or/and interposed, rather than excluding other components, unless specifically stated to the contrary.

As used herein, unless otherwise indicated or explicitly contradicted by context, it should be interpreted as including both singular and plural. The term "or" means "and/or" unless otherwise specified. Throughout the present specification, "an embodiment", "example embodiment", "exemplary embodiment", etc. are included in at least one embodiment in which specific elements described in connection with the embodiment are included in this specification, which means that these elements may or may not exist in another embodiment. Further, it should be understood that the described elements may be combined in any suitable manner in various embodiments. Unless otherwise defined, all terms including technical and scientific terms used herein have the same meaning as commonly understood by one of ordinary skill in the art to which this disclosure belongs. All cited patents, patent applications and other references are incorporated herein by reference in their entirety. However, if the terms in this specification contradict or conflict with the terms of the incorporated references, the terms from this specification take precedence over the conflicting terms in the incorporated reference. While specific embodiments and implementations have been described, alternatives, modifications, variations, improvements and substantive equivalents that are currently unexpected or unforeseeable may occur to applicants or those skilled in the art. Accordingly, the appended claims and amendments are intended to include all such alternatives, modifications, improvements and substantial equivalents.

An oxygen barrier film according to an embodiment may include a base layer and an organic/inorganic hybrid layer located on the base layer and including a natural hydrogel and a silane coupling agent.

The oxygen barrier film according to an embodiment includes a silane coupling agent in the organic-inorganic hybrid layer, and the silane coupling agent serves to fix a natural hydrogel, thereby improving interlayer adhesive force between the base layer and the organic-inorganic hybrid layer. In addition, the organic-inorganic hybrid layer may have excellent oxygen barrier properties while being reproducible.

FIG. 1 is a schematic view of an oxygen barrier film according to an embodiment.

Referring to FIG. 1, the oxygen barrier film 10 according to an embodiment has a structure in which a silane coupling agent is dispersed and crosslinked (2) in a natural product having a three-dimensional network structure, for example, a protein hydrogel 1. The structure of the oxygen barrier film 10 may be confirmed from the IR spectrum analysis of Analysis Example 1 to be described later.

In the oxygen barrier film 10 according to an embodiment, a silane coupling agent is crosslinked (2) in a natural product having a three-dimensional network structure, for example, a protein hydrogel 1, and thus mechanical properties of the oxygen barrier film 10 may be improved.

The natural hydrogel may include protein, carbohydrate, or a combination thereof.

For example, the protein may include whey protein isolate (WPI), whey protein concentrate (WPC), soy protein isolate (SPI), rice protein isolate (RPI), oat Protein (oat protein isolate: OPI), pea protein isolate (PPI), casein, sodium caseinate, corn zein, gelatin, wheat protein (gluten), or a combination thereof.

For example, the carbohydrate may include pullulan, carrageenan, chitosan, starch, agar, pectin, or a combination thereof.

For example, protein is a high-molecular compound in which a plurality of amino acid units are linked by peptide bonds, and may exhibit excellent oxygen barrier properties by a plurality of peptide bonds. Further, when a coating layer is formed using a coating composition containing the protein, the peptide bonds become hydrogen bonds or covalent bonds to each other, and further, a three-dimensional network structure may be formed in a hydrogel structure containing a large amount of water. As a result, the oxygen barrier film according to an embodiment may achieve oxygen barrier properties required in food wrappers.

The silane coupling agent may include a silane containing a functional group selected from a vinyl group, an amino group, an epoxy group, an acryl group, a methacrylic group, a methoxy group, an ethoxy group, a trimethoxy group, a triethoxy group, or a combination thereof. For example, the silane coupling agent may include aminosilane, epoxy silane, acrylic silane, or a combination thereof.

The weight ratio of solids of the protein hydrogel to the silane coupling agent may be 10:1 to 1:10. The weight ratio of solids of the protein hydrogel to the silane coupling agent may be, for example, 5:1 to 1:5 or 3:1 to 1:3 When the weight ratio of solids of the protein hydrogel to the silane coupling agent satisfies the above range, the oxygen barrier film may have excellent adhesive force between the base layer and the organic/inorganic hybrid layer, and a food wrapper including the oxygen barrier film may stably secure oxygen barrier properties (blocking properties).

The organic-inorganic hybrid layer may have a thickness of 1 μm to 10 μm. For example, the organic-inorganic hybrid layer may have a thickness of 1 μm to 7 μm or 1 μm to 5 μm. When the thickness of the organic-inorganic hybrid layer satisfies the above range, the organic-inorganic hybrid layer may have adequate oxygen barrier properties usable for food wrappers and excellent adhesive force between the base layer and the organic-inorganic hybrid layer.

The base layer may include a polyolefin-based substrate, a polyester-based substrate, or a combination thereof. For example, the polyolefin-based substrate may include polyethylene, polypropylene, or a combination thereof. For example, the polyester-based substrate may include polyethylene terephthalate, polybutylene terephthalate, polyethylene-2,6-naphthalenedicarboxylate (PEN), or a combination thereof. The polyolefin-based substrate or the polyester-based substrate may be a polyolefin-based film or a polyester-based film, which includes particles for ease of processing.

If necessary, the base layer may further include a biodegradable substrate.

For example, the biodegradable substrate may be, but is not limited to, a biodegradable substrate including polylactic acid (PLA), polybutylene adipate-co-terephthalate (PBAT), polycaprolactone (PCL), aliphatic polyester (AP), polyglycolic acid (PGA), polybutylene succinate (PBS), polyhydroxyalkanoate (PHA), polyhydroxybutyrate (PHB), polyhydroxyvalerate (polyhydroxyvalerate, PHV), modified starch (thermoplastic starch: TPS), or the like.

Figure 4:
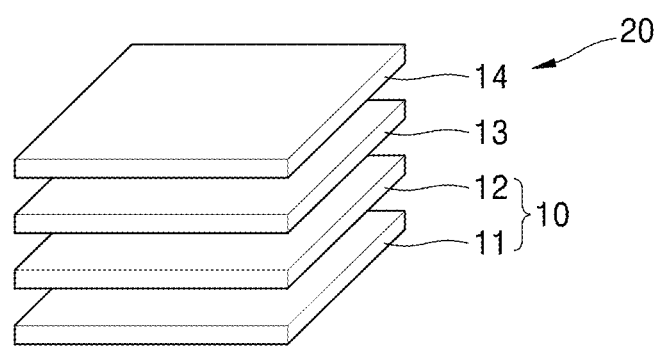
FIG. 4 is a schematic view of a food wrapper according to an embodiment.

FIG. 4 is a schematic view of a food wrapper according to an embodiment.

As shown in FIG. 4, a food wrapper 20 according to another embodiment may be a laminated structure including a base layer 11, an organic-inorganic hybrid layer 12 located on the base layer 11 and including protein hydrogel and a silane coupling agent, an adhesive layer 13 located on the organic-inorganic hybrid layer 12, and a polymer layer 14 located on the adhesive layer 13.

The base layer 11 and the organic-inorganic hybrid layer 12 located on the base layer 11 and including protein hydrogel and a silane coupling agent are included in the above-described oxygen barrier film 10. Accordingly, since respective compositions, contents, and structures are the same as those described above, hereinafter, descriptions thereof will be omitted.

The adhesive layer 13 may include an oil-based adhesive, an aqueous adhesive, or a combination thereof.

The adhesive layer 13 may include an adhesive such as a polyurethane-based resin, a polyamide-based resin, an ethylene-vinyl acetate-based resin, a polyvinyl acetate-based resin, and a phenol-based resin, a melamine-based resin, a urea-based resin, an epoxy-based resin, a polyester-based resin, a polyvinyl alcohol-based resin, acrylonitrile butadiene rubber (NBR), styrene butadiene rubber (SBR), alkyd, acetyl cellulose, nitro cellulose, starch, hot melt thermoplastic polyurethane resin, or a combination thereof. The oil-based adhesive layer may be formed using an oil-based adhesive known in the art. For example, the oil-based adhesive layer may include an oil-based polyurethane-based resin. The aqueous adhesive layer may include an aqueous adhesive known in the art, and, for example, may include an aqueous polyurethane-based resin, a polyvinylpyrrolidone resin, a polyvinyl alcohol resin, an aqueous acrylic resin, an epoxy resin, a phenol resin, starch, or a combination thereof.

The polymer layer 14 may include a polyethylene-based polymer, polypropylene-based polymer, polyamide-based polymer, or a combination thereof. For example, the polymer layer 14 may include polyethylene, polypropylene, or nylon. For example, the polymer layer 14 may include low density polyethylene (LDPE). However, the polymer layer 14 may use any polymer available for food wrappers other than the above-described polymer.

A method of preparing an oxygen barrier film according to another embodiment may include the steps of: adding a silane coupling agent and a filler to an aqueous protein solution to prepare a pre-composition for an organic-inorganic hybrid layer; heat-treating and then cooling the pre-composition for an organic-inorganic hybrid layer to prepare a composition for an organic-inorganic hybrid layer; and applying the composition for an organic-inorganic hybrid layer onto a base layer to prepare the above-described oxygen barrier film. According to the method of preparing an oxygen barrier film, an oxygen barrier film may be easily prepared, and an oxygen barrier film having excellent adhesive force between the base layer and the organic-inorganic hybrid layer while having excellent oxygen barrier properties may be prepared.

First, a silane coupling agent and a filler are added to an aqueous protein solution to prepare a pre-composition for an organic-inorganic hybrid layer.

Since the compositions and contents of the protein and the silane coupling agent are the same as those described above, hereinafter, descriptions thereof will be omitted.

The filler may include sorbitol, fructose, sucrose, mannitol, propylene glycol, glycerol, polyethylene glycol, or a combination thereof.

The filler is disposed in pores between the three-dimensional network structures of the protein hydrogel and fills the pores to increase the oxygen barrier properties (blocking properties) of the organic-inorganic hybrid layer and to smooth the surface of the organic-inorganic hybrid layer.

The content of the filler may be 3 parts by weight to 30 parts by weight, for example, 5 parts by weight to 15 parts by weight, per 100 parts by weight of the pre-composition for the organic-inorganic hybrid layer. When the content of the filler satisfies the above range, there is an advantageous effect in terms of the appearance, mechanical properties, and oxygen barrier properties of the oxygen barrier film and/or food wrapper. When the content of the filler is less than 3 parts by weight, the final result, the coating film of the organic-inorganic hybrid layer may be cracked and peeled from the base layer, and when the content thereof is more than 30 parts by weight, the filler migrates during long-term storage of the coating film of the organic-inorganic hybrid layer, thereby lowering the transparency of the food wrapper and deteriorating the oxygen barrier properties of the food wrapper.

Distilled water or purified water may be used as a solvent of the aqueous protein solution.

The content of the solvent may be 50 parts by weight to 99 parts by weight, for example, 70 parts by weight to 90 parts by weight, per 100 parts by weight of the composition for the organic-inorganic hybrid layer.

Next, the pre-composition for an organic-inorganic hybrid layer is heat-treated for sufficient chemical reaction and then cooled to prepare a composition for an organic-inorganic hybrid layer.

The heat treatment may be performed at a temperature of 70° C. to 120° C. for 1 hour to 5 hours. For example, the heat treatment may be performed at a temperature of 80° C. to 100° C. for 2 hours to 3 hours. When the heat treatment temperature and time satisfies the above ranges, mechanical properties of the organic-inorganic hybrid layer may be improved.

Alternatively, the composition for the organic-inorganic hybrid layer may be prepared as follows.

The composition for the organic-inorganic hybrid layer may be prepared by a one-step reaction of directly preparing a coating agent by inducing a natural product-silane coupling agent reaction together with a hydrolysis reaction of the silane coupling agent. Alternatively, the composition for the organic-inorganic hybrid layer may be prepared by a two-step reaction of first preparing a hydrolyzed silane coupling agent, fully completing a natural product-silane coupling agent reaction and then preparing a coating agent.

Next, the composition for the organic-inorganic hybrid layer is applied onto a base layer to prepare the above-described oxygen barrier film.

Since the composition of the base layer is the same as described above, hereinafter, a description thereof will be omitted.

The thickness of the base layer may be 0.1 µm to 20 µm, for example, 1 µm to 15 µm. The thicker the base layer, the higher the oxygen barrier properties, and the thinner the base layer, the more economical in terms of a manufacturing process.

The application may be performed, for example, by coating.

The coating may be performed by a method such as spin coating, spray coating, dip coating, slit coating, slot die coating, or bar coating, but the present disclosure is not limited thereto.

Hereinafter, Examples and Comparative Examples of the present disclosure will be described. However, the following examples are only examples of the present disclosure, and the present disclosure is not limited thereto.

EXAMPLES

<Preparation of Composition for Organic-Inorganic Hybrid Layer/Composition for Organic Layer>
Preparation of Example Composition 1

5 g of whey protein was slowly added to 92 g of distilled water and simultaneously stirred to prepare an aqueous protein solution. 8 g of aminosilane was dissolved in the aqueous protein solution, and then 5 g of sorbitol was added to prepare a pre-composition for an organic-inorganic hybrid layer. 1N NaOH was added to the pre-composition for the organic-inorganic hybrid layer to adjust the pH of the preliminary composition to 9. Thereafter, the pH-adjusted pre-composition was stirred at 300 rpm using a mechanical stirrer, heated to 90° C. for 120 minutes, and then cooled to room temperature to prepare a composition for the organic-inorganic hybrid layer.
Preparation of Comparative Composition 1

A composition for an organic layer was prepared in the same manner as in the preparation of Example Composition 1, except that 8 g of the silane coupling agent was not added.
<Preparation of Oxygen Barrier Film>

Example 1

Example composition 1 was applied onto a polyethylene terephthalate (PET) base layer (thickness: 12 µm) to a thickness of about 1 µm using an applicator (YBA-5), and then dried at about 120° C. for about 3 minutes using a hot-air dryer to prepare an oxygen barrier film.

Comparative Example 1

An oxygen barrier film was prepared in the same manner as in Example 1, except that Comparative Composition 1 was used instead of Example Composition 1.
<Manufacturing of Food Wrapper>

Example 2

A composition for a polyurethane-based adhesive layer was applied onto the oxygen barrier film of Example 1 to a thickness of about 8 µm. A low-density polyethylene (LDPE) polymer layer was disposed on the barrier film coated with the composition for the adhesive layer, and then laminated by a dry lamination method to manufacture a food wrapper.

Comparative Example 2

A food wrapper was manufactured in the same manner as in Example 3, except that the oxygen barrier film of Comparative Example 1 was used instead of the oxygen barrier film of Example 1.

Analysis Example 1: IR Spectrum Analysis

For the oxygen barrier films of Example 1 and Comparative Example 1, IR spectra were measured to determine whether crosslinking was performed. The results thereof are shown in FIGS. 2A and 2B, respectively.

Figure 2A:
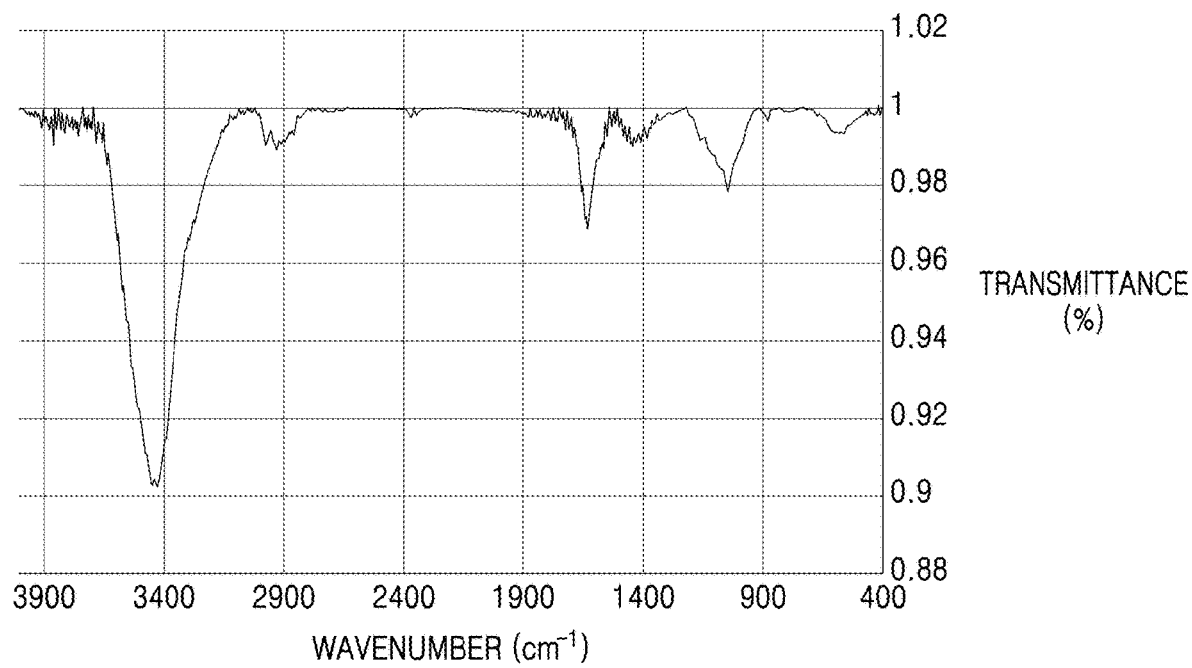
FIGS. 2A and 2B are results of measuring IR spectra of oxygen barrier films of Example 1 and Comparative Example 1, respectively.
Figure 2B:
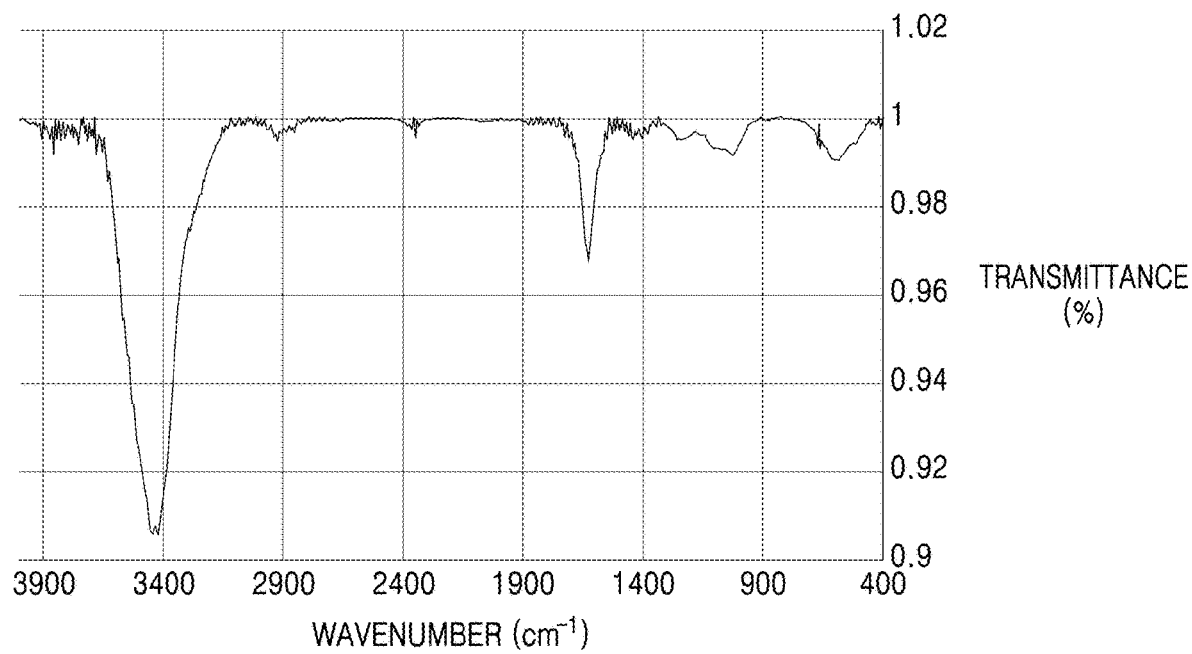

Referring to FIG. 2A, in the oxygen barrier film of Example 1, a high peak appeared at 900 to 1200 cm$^{-1}$ corresponding to a C—N bond as compared with the oxygen barrier film of Comparative Example 1. Further, a high peak appeared at 2800 to 3000 cm$^{-1}$ corresponding to a C—H bond.

From this, it may be confirmed that the oxygen barrier film of Example 1 has a structure in which a silane coupling agent is dispersed and crosslinked inside a protein hydrogel having a three-dimensional network structure.

Evaluation Example 1: Evaluation of Adhesive Force Between Base Layer and Organic-Inorganic Hybrid Layer For the oxygen barrier films of Example 1 and Comparative Example 1, adhesive force between a PET base layer and an organic-inorganic hybrid layer was evaluated. The results thereof are shown in FIGS. 3A and 3B, respectively.

In order to evaluate the adhesive force, the oxygen barrier film was cross-cut to an area of about 20 mm×20 mm. Then, tape (Nitto tape) was attached and detached to check whether a coating layer was peeled off.

Figure 3A:
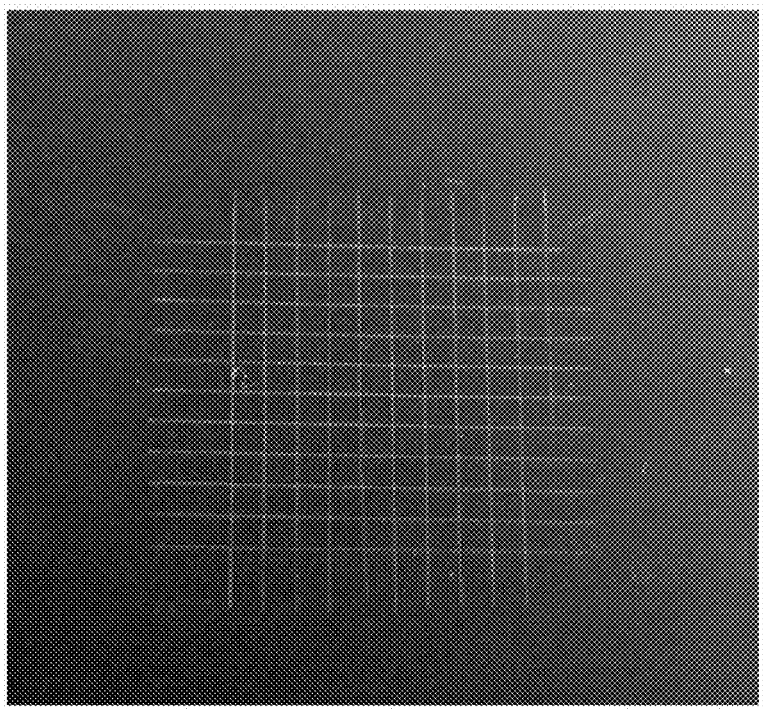
FIGS. 3A and 3B are results of evaluating adhesive force between a PET base layer and an organic-inorganic hybrid layer for the oxygen barrier films of Example 1 and Comparative Example 1, respectively.
Figure 3B:
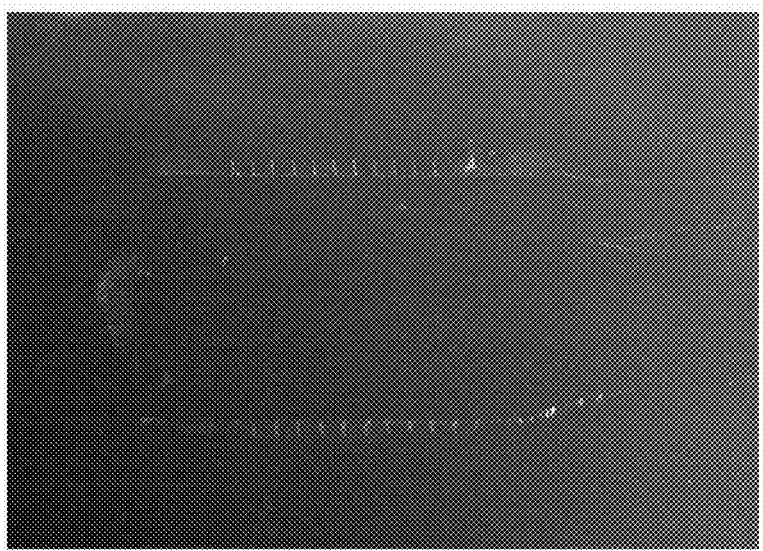

Referring to FIG. 3A, it may be found that in the oxygen barrier film of Example 1, the entire coating layer was attached to the base layer and did not peel off at all, and referring to FIG. 3B, it may be found that in the oxygen barrier film of Comparative Example 1, a lot of the coating layer was peeled off.

Evaluation Example 2: Evaluation of Oxygen Barrier Properties (Blocking Properties)

For the oxygen barrier films of Example 1 and Comparative Example 1, oxygen barrier properties (blocking properties) were evaluated. The results thereof are shown in Table 1 below.

The evaluation of oxygen barrier properties (blocking properties) was conducted from the results of measuring oxygen permeability using an oxygen permeability tester (MOCON company, OXTRAN 2/21). The oxygen permeability refers to an amount of oxygen passing through a food wrapper for 24 hours at a temperature of 23±1° C. and an $O_2$ concentration of 100%.

TABLE 1

|  | Oxygen permeability (cc/m² · day) |
| --- | --- |
| Example 1 | 0.24 |
| Comparative Example 1 | 0.38 |

Referring to Table 1, the oxygen barrier film of Example 1 had lower oxygen permeability than the oxygen barrier film of Comparative Example 1. From this, it may be confirmed that the oxygen barrier film of Example 1 has excellent oxygen barrier properties (blocking properties) as compared to the oxygen barrier film of Comparative Example 1.

The invention claimed is:

1. An oxygen barrier film comprising:
a base layer; and
an organic-inorganic hybrid layer located on the base layer and including a natural hydrogel and a silane coupling agent, and
wherein the natural hydrogel comprises protein,
wherein the protein is a whey protein,
wherein
the organic-inorganic hybrid layer has a structure in which the silane coupling agent is dispersed and crosslinked in the natural hydrogel having a three-dimensional network structure,
a weight ratio of solids of the protein to the silane coupling agent is 10:1 to 1:10,
the silane coupling agent is dispersed and crosslinked with the protein of the natural hydrogel by bonding which includes C—N bond and C—H bond, and
the silane coupling agent is an aminosilane, and the protein and the aminosilane are combined to form the crosslinked three-dimensional network structure with an amide bond,
wherein
the organic-inorganic hybrid layer further includes a filler which is disposed in pores between the crosslinked three-dimensional network structures, and a content of the filler is 5 parts by weight to 15 parts by weight, per 100 parts by weight of a pre-composition for the organic-inorganic hybrid layer, and
the filler is a sorbitol,
wherein
the aminosilane and the filler are added into an aqueous protein solution to prepare the pre-composition for the organic-inorganic hybrid layer,
the pre-composition for the organic-inorganic hybrid layer is heat-treated and then cooled to prepare a composition for the organic-inorganic hybrid layer, and
the composition for the organic-inorganic hybrid layer is applied onto the base layer to prepare the oxygen barrier film,
and
wherein
the pre-composition for the organic-inorganic layer is heat-treated under a condition of 80° C. to 90° C. for 2 hours to 3 hours and then cooled, and
the organic-inorganic hybrid layer shows, in an infrared spectroscopy measurement, predetermined levels of peaks at 900 to 1200 cm$^{-1}$ corresponding to the C—N bond and at 2800 to 3000 cm$^{-1}$ corresponding to the C—H bond.

2. The oxygen barrier film of claim 1, wherein the natural hydrogel further includes carbohydrate.

3. The oxygen barrier film of claim 2, wherein the carbohydrate includes pullulan, carrageenan, chitosan, starch, agar, pectin, or a combination thereof.

4. The oxygen barrier film of claim 1, wherein the base layer includes a polyolefin-based substrate, a polyester-based substrate, or a combination thereof.

5. A food wrapper comprising:
the oxygen barrier film of claim 1;
an adhesive layer located on the oxygen barrier film; and
a polymer layer located on the adhesive layer.

6. The food wrapper of claim 5, wherein the adhesive layer includes an oil-based adhesive, an aqueous adhesive, or a combination thereof.

7. The food wrapper of claim 5, wherein the polymer layer includes a polyethylene-based polymer, polypropylene-based polymer, polyamide-based polymer, or a combination thereof.

8. The food wrapper of claim 5, wherein the natural hydrogel further includes carbohydrate.

9. The food wrapper of claim 8, wherein the carbohydrate includes pullulan, carrageenan, chitosan, starch, agar, pectin, or a combination thereof.

10. The food wrapper of claim 5, wherein the base layer includes a polyolefin-based substrate, a polyester-based substrate, or a combination thereof.

11. A method of preparing the oxygen barrier film of claim 1, the method comprising:
adding the silane coupling agent and a filler to an aqueous protein solution to prepare a pre-composition for an organic-inorganic hybrid layer;
heat-treating and then cooling the pre-composition for the organic-inorganic hybrid layer to prepare the composition for the organic-inorganic hybrid layer; and
applying the composition for the organic-inorganic hybrid layer onto the base layer to prepare the oxygen barrier film of claim 1.

* * * * *